United States Patent [19]

Nicolay

[11] Patent Number: 5,275,865
[45] Date of Patent: Jan. 4, 1994

[54] OVERHEAD LINING DESIGNED AS SELF-SUPPORTING, INTEGRAL SHAPED BOWL

[75] Inventor: Albert Nicolay, Meinhard-Neuerode, Fed. Rep. of Germany

[73] Assignee: Lignotock GmbH, Sontra, Fed. Rep. of Germany

[21] Appl. No.: 815,273

[22] Filed: Dec. 27, 1991

[30] Foreign Application Priority Data

Dec. 27, 1990 [DE] Fed. Rep. of Germany ....... 4041934

[51] Int. Cl.⁵ ................. B32B 1/00; D03D 3/00; B60J 7/00
[52] U.S. Cl. ................. 428/174; 428/156; 428/167; 428/172; 428/192; 428/212; 428/219; 428/224; 428/280; 428/284; 428/292; 296/214
[58] Field of Search ............ 428/156, 172, 36.4, 428/36.2, 68, 72, 99, 121, 219, 224, 280, 284, 292, 192, 174, 212, 167; 296/210, 214

[56] References Cited

U.S. PATENT DOCUMENTS 4,150,850 4/1979 Doerfling ................. 428/137
4,933,225 6/1990 Abe ........................ 428/157

Primary Examiner—Donald J. Loney

[57] ABSTRACT

An overhead lining for vehicular inside roof linings of passenger cars is described, which is designed as self-supporting, integral shaped bowl. The overhead lining is made by compressing a mat of refuse nonwoven fabric, while exerting a pressure thereon at an elevated temperature. For this purpose, the refuse nonwoven fabric is made up of a mixture of at least 30 percent up to a maximum of 90 percent of partially stretched polyester fibers with parts of polyester high-bulk fibers, supplemented to 100 percent. The weight per unit area of the finished shaped bowl is between 600 and 1,200 grams per square meter, and the thickness is between 1 and 10 millimeters. The shaped bowl, on its one visual surface, is lined without an additional cement being used. The wall thickness of said shaped bowl may vary across its surface, and compaction of said shaped bowl, in the regions of its mounting elements, may be higher than in other regions.

6 Claims, 1 Drawing Sheet

OVERHEAD LINING DESIGNED AS SELF-SUPPORTING, INTEGRAL SHAPED BOWL

BACKGROUND OF THE INVENTION

1. Field of the Invention

The invention relates to an overhead lining, designed as self-supporting, integral shaped bowl and mountable, as vehicular inside roof lining, to the roof structure of the body of a passenger car as described herein.

2. Description of the Related Art

Such shaped bowls have become known e.g. by German Utility Model 71,14,684. This known shaped bowl having a thickness of some centimeters is made of lightweight foam or hard foam material and, apart from effective protection of the passengers in case of accidents, shall, in particular, also serve the purpose of damping the noise of the sound issuing through the car body and of temperature-insulating. The shaped bowl may be squeezed into the roof structure of the vehicle but it may also be permanently bonded to the lower roof of the vehicle by means of adhesive bonds. Both plastic foils and sheeting fabrics of all kinds serve as linings for the known integral shaped bowl.

There also is another known padded inner lining for the roof of a vehicle, which lining is made of foam or another yielding bolstering material, has a cover in the form of a foil, artificial leather, leather or textile fabric and, together with the air ducts formed towards the lined roof, is mounted to said air ducts with the aid of spacers, such as e.g. materially uniform ribs, foamed or separately attached thereto (German Laying-open Specification 15 55 667).

Aside from a sufficient bolstering effect, such vehicular inside roof linings must not only be highly capable of withstanding mechanical stresses or taking loads, but also must convey an optically uttermost favorable appearance. Self-supporting, flexible shaped parts, which constitute such overhead linings, are subject to further essential preconditions, such as e.g. improved dimensional stability also with extreme moisture or temperature variations. With sufficient vapor-permeability, such bowls must always maintain the desired mechanical stability, and that with as low as possible a weight, i.e. material minimizing.

Departing from such self-supporting, flexible overhead linings comprising an appropriate surface lining, it is the object of the present invention to impart improved bending flexibility to the shaped bowl, regardless of the fact that improvement in material minimization is always worth aspiring after, so that it may, e.g. even subsequently, be introduced into the back of the passenger car through an opened window of same, as well as to enable lining of said shaped bowl without the use of cement, which bowl shall be of a material, that can be recycled, and shall be free from bonding-agent additives. The method of producing such self-supporting overhead linings shall have the merits of simplicity and of little need of employing tools.

SUMMARY OF THE INVENTION

According to the invention, this object, relating to the overhead lining which can be assembled as vehicular inside roof lining in one piece, is solved by the features stated in the characterizing clause of claim 1. Advantageous developments in connection with the solution of the object and covering the subject matter of the invention will result as described herein.

Turning to the method of producing such overhead linings, the above-mentioned object is, according to the invention, solved by the features described below.

Insofar as self-supporting shaped bowls, which are used as vehicular inside roof linings in passenger cars, have hitherto been pressed from refuse nonwoven fabric, for instance from a fibrous lignocellulose material, addition of bonding agents was obligatory. Consequently, long-time evaporations of the bonding-agent additives in the back of the passenger car, which are not free of any solvents, have hitherto always been considered as inevitable. The necessary natural stability of the self-supporting bowls imparted only a small amount of bending flexibility to the latter so that they could be installed only in brand-new cars resp. only in cases, in which at least the windshield resp. the rear window had been completely removed. Elevated moisture rates in the interior of the vehicle, and that especially in cases where they had been present for longer periods, quite often resulted in such high dimensional variations of the self-supporting bowls that the latter were mechanically engaged only along their edge supports.

The self-supporting, integral shaped bowl, designed according to the invention, shows such improved bending flexibility that it may be introduced into the back of the vehicle e.g. also through the side windows of same. It was found that, with the shaped bowl assembled in accordance with the invention, dimensional stability always is ensured, and that even in case of high moisture variations and considerable temperature changes. The acoustic properties in the interior of the vehicle are optimized due to the extraordinarily thin bowl of the inside roof lining, which, correspondingly, holds true also for its vapor-permeability. Given the cement-free lining of the bowl of said inside roof lining with an appropriate lining material, the hitherto common long-time evaporations of chemical constituents of the cement as well as of the solvent-containing bonding agent used with the known vehicular inside roof linings are fully eliminated.

Applying a mixture of partially stretched polyester fibers and polyester high-bulk fibers in accordance with the invention specifically enables a simplified production, with which shaping-out of the shaped bowl and lining of the latter may be carried out in one method step and in which case a part, that can be deep-drawn to full extent, is given. No difficulties are experienced when the lining material is underlaid with foam at desired positions. It is of special advantage when the mixture of the used refuse nonwoven fabric for the production of said self-supporting overhead lining is made up of 30 percent up to a maximum of 90 percent of partially stretched polyester fibers, the remaining part of the mixture being supplemented by polyester high-bulk fibers. In this way, shaped bowls having a weight per unit area of between 40 and 1,200 grams per square meter, preferably of 1,000 grams per square meter, can be made. It is especially favorable for the part of stretched fibers to be near 70 percent in the mixture. According to the partial load or stress imparted to said shaped bowl, its thickness may be regionally varied and, for instance at positions at which special loads may occur, it may comprise corresponding reinforcements.

Along the edge structure, i.e. the border edge of said shaped bowl, and equidistantly thereto, a circumferential bending groove is formed in each of the vehicular inside roof linings so that this border-edge region can be folded resp. bent over by 180 degrees, resulting in a circumferential, beaded border edge. In correspondence therewith, the roof structure of the passenger car may be designed in such a way that this circumferential bead may be inserted in the corresponding portion of the car body in force-locking and form-locking manner and removably mounted thereto.

The method of producing the overhead linings according to the invention is characterized by several method steps, namely at first by the production of mats of nonwoven fabric, made up of 30 to 90 percent of partially stretched polyester fibers and of 10 to 70 percent of polyester high-bulk fibers, a weight per unit area of between 40 and 1,200 grams per square meter, preferably of 1,000 grams per square meter, being given. Without adding any bonding agent or the like solvent-containing additive to the refuse nonwoven fabric, stabilization of same, nevertheless, is ensured in that, subsequently to the production of said nonwoven fabric, preferably several of such fabrics are needled to form a fabric mat, e.g. by trickling onto a running conveyer belt, which mat should have a thickness of between 15 and 20 millimeters. Needling results in sufficient transport-withstanding stability, guaranteeing interconnection of the refuse fibers till shaping-out. Then, blanks are cut out of said mat of nonwoven fabric in correspondence with the contour of the shaped bowl, which, advantageously, might be carried out at the same time as the lining. It is also conceivable to procure a separate cut-out of lining on the one hand and a blank of nonwoven fabric on the other hand. In subsequence thereto and with the lining blank and the blank of nonwoven fabric arranged one above the other, this double-layer arrangement is compressed in a closed tool in the method course, only very weak overall pressure per unit area at relatively low temperatures being required for this purpose, which, with the present method, are between 90° and 180° Centigrade. The originally adhesive properties of the polyester fibers are removed during this pressing operation, i.e. the partially stretched fibers, irreversibly, lose their adhesiveness.

BRIEF DESCRIPTION OF THE DRAWINGS

The present invention will hereinafter be explained in more detail and in conjunction with the annexed drawing which shows an advantageous design for producing the overhead lining in simplified manner.

DESCRIPTION OF THE PREFERRED EMBODIMENT

Figure 1:
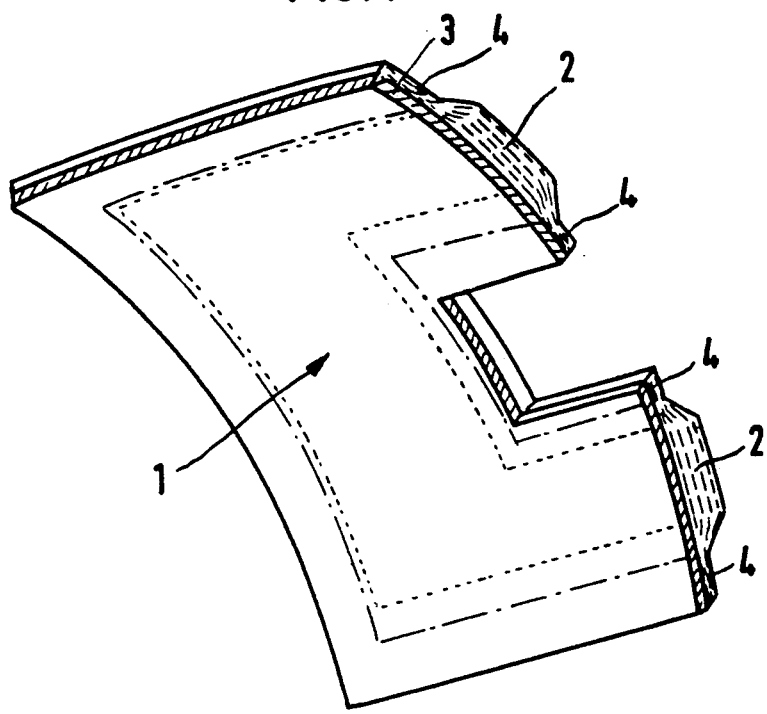
FIG. 1 is a perspective sectional view of the underside of an overhead lining according to the invention.

As shown in FIG. 1, the overhead lining 1 is substantially characterized by a compressed mat 2 of nonwoven fabric with a compacted portion which is assigned to the main area of the shaped bowl. The circumferential edge region 3, both with reference to the outer contour of said shaped bowl and in the possibly provided sliding-roof region, attains additional stability due to a zone 4 of higher compaction, the course of which is indicated in dashed lines. The visual side of the overhead lining 1 is covered by the firmly adhering decorative lining which is applied simultaneously with the production of said shaped bowl in a single working operation and is fixed with the aid of the temporary adhesiveness of the partially stretched polyester fibers.

Figure 2:
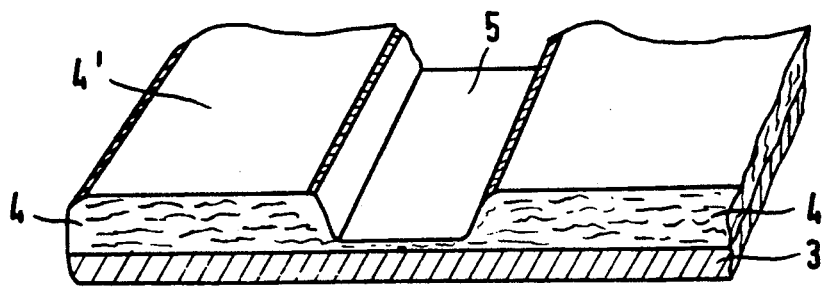
FIGS. 2 and 3 are like representations illustrating the bending-over operation with the help of a border edge of the shaped bowl, said border edge being in the form of some kind of plastic joint.
Figure 3:
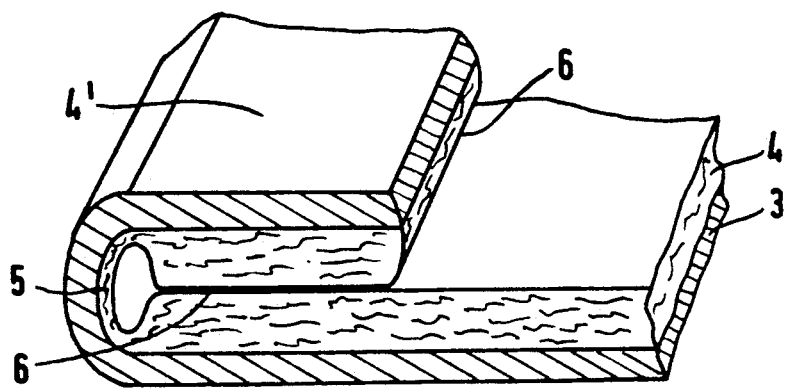

FIG. 2 shows a shaped bowl having a circumferential edge trim. Upon bending-over, i.e. when the lining is laid around the edges of said shaped bowl, an edge zone 4' may be separated by some kind of plastic joint 5, i.e. by a zone of higher additional compaction, in the region resp. the zone 4 of higher compaction. The "plastic joint" 5, which is about twice as wide as the thickness of the compacted zone 4, then enables bending-over of the edge zone 4' in the manner depicted in FIG. 3, preferably with the use of an additional cement 6. Thus, a circumferential beaded edge results from this bending-over operation, which beaded edge may advantageously be used for connecting the overhead lining to the vehicle in form-locking manner. Such a snap connection enables possible subsequent disconnection and removal of the overhead component part, said connection, at the same time, being capable of compensating for production tolerances.

If the zone 4 is comparted gradually, a bend is, moreover, made possible which is approximately flush with the adjacent regions of zone 4. The mats of refuse nonwoven fabric for the production of the overhead lining according to the invention may advantageously also be made by strewing in a single strewing operation with the projected thickness (15 to 20 millimeters) and, thus, this single-layer fabric may be needled. However, it may also be desired to make several thin individual fabrics by pouring and, subsequently, needle them to form a complete mat. Extra advantages result thereby in individual cases, namely:

1) with limited plant capacity, yet a wide variety,
2) a corresponding range of variation when other sorts of fibers are incorporated into the fabric mat, when the strewing characteristics of the fibers are quite different and when
3) additional finishings are to be used in individual layers, e.g. when it is intended to attain top layers of the mat with special properties, possibilities of accurate metering for this purpose.

A special advantage of the shaped bowls according to the invention resides in that they can be recycled. Since the partially stretched polyester fibers retain their fibrous structure despite their temporary bonding properties, the shaped bowls can, in a willowing machine, be recycled again to fibers, and that, above all, in cases in which also the lining is made up of fibers (webs).

A special lightweight, favorable density per unit area of the fabric for the wood-fiber mat is near a rate of 40 grams per square meter with 40 percent of partially stretched polyester fibers and 60 percent of viscose, i.e. bulk-fiber part.

I claim:

1. A roof lining which is designed as self-supporting, integral shaped bowel and which can be mounted as inside roof lining to the roof structure of a body of a passenger car, said roof lining having a supporting element of packed refuse fibers and a decorative coat of sheets, knitted fabrics or other suitable materials on the visual side, said roof lining comprising said supporting element consisting of a mixture of partially stretched polyester fibers and polyester high-bulk fibers, said partially stretched polyester fibers having a weight part ranging from 30% by wt. to 90% by wt. and said polyester high-bulk fibers having a part ranging from 70% by wt. to 10% by wt., and that the decorative coat on the visual side is applied without using additional adhesives.

2. The overhead lining according to claim 1, wherein the partially stretched fiber part is 70 percent of said mixture.

3. The overhead lining according to claim 1, wherein the mat thickness of the shaped bowl varies across its surface.

4. The roof lining as set forth in claim 1, wherein the weight per unit area of said supporting element ranges from 600 to 1,200 grams/sq. meter and its thickness ranges from 1 to 10 mm.

5. The overhead lining according to anyone of claims 2, 3 or 4, further comprising mounting elements for mounting said overhead lining to said roof structure, and wherein regions of said mounting elements are higher than in other regions of said shaped bowl, being compressed due to said shape bowl.

6. The overhead lining according to claim 1, wherein said shaped bowl has an edge and an edge structure and wherein a bending groove is defined along said edge structure and spaced apart from said edge on a back side thereof, said groove is a plastic joint enabling folding of the edge.

* * * * *